United States Patent [19]

Huron et al.

[11] 4,036,943

[45] July 19, 1977

[54] PROCESS FOR REMOVING SULFUR DIOXIDE FROM A GAS AND PRODUCING SULFUR THEREFROM

[75] Inventors: Marie-José Huron, Orsay; Yves Jacquin, Sevres; Philippe Renault, Noisy le Roi, all of France

[73] Assignee: Institut Francais du Petrole, Rueil-Malmaison, France

[21] Appl. No.: 633,121

[22] Filed: Nov. 18, 1975

Related U.S. Application Data

[63] Continuation-in-part of Ser. No. 394,336, Sept. 4, 1973, abandoned.

[30] Foreign Application Priority Data

Sept. 15, 1972  France .................................. 72.32926

[51] Int. Cl.$^2$ .................. C01B 17/02; C01B 1/02; C01B 17/50
[52] U.S. Cl. .................. 423/576; 423/242; 423/356; 423/541 A; 423/571 R; 423/570; 423/571; 423/574 L; 423/575
[58] Field of Search .................. 423/242, 539, 541, 563, 423/567, 569, 570-573, 575

[56] References Cited

U.S. PATENT DOCUMENTS

| 1,771,481 | 7/1930 | Brenner et al. | 543/570 |
| 2,676,090 | 4/1954 | Johnstone | 423/541 |
| 3,383,170 | 5/1968 | Furkert et al. | 423/541 |
| 3,598,529 | 8/1971 | Deschamps et al. | 423/575 |
| 3,615,231 | 10/1971 | Cullom | 423/570 |
| 3,752,877 | 8/1973 | Beavon | 423/573 |
| 3,764,665 | 10/1973 | Gronendaal et al. | 423/570 |
| 3,794,710 | 2/1974 | Merril | 423/573 |
| 3,810,968 | 5/1974 | Renault et al. | 423/541 A |
| 3,832,454 | 8/1974 | Renault et al. | 423/575 |
| 3,833,715 | 9/1974 | Deschamps et al. | 423/573 |

FOREIGN PATENT DOCUMENTS

| 804,509 | 3/1974 | Belgium | |
| 1,089,716 | 11/1967 | United Kingdom | 423/570 |
| 5,959 | 12/1883 | United Kingdom | 423/573 |

*Primary Examiner*—O. R. Vertiz
*Assistant Examiner*—Gary P. Straub
*Attorney, Agent, or Firm*—Millen & White

[57] ABSTRACT

A $SO_2$-containing gas is contacted with an ammonia solution, the resulting ammonium sulfite solution is vaporized to $SO_2$ and $NH_3$, $SO_2$ is partially reduced to $H_2S$ and the resulting gas containing both $SO_2$ and $H_2S$ is first contacted with a catalyst to produce sulfur and then made free of sulfur by solvent washing; recovered $NH_3$ is used to re-constitute the ammonia solution.

15 Claims, 1 Drawing Figure

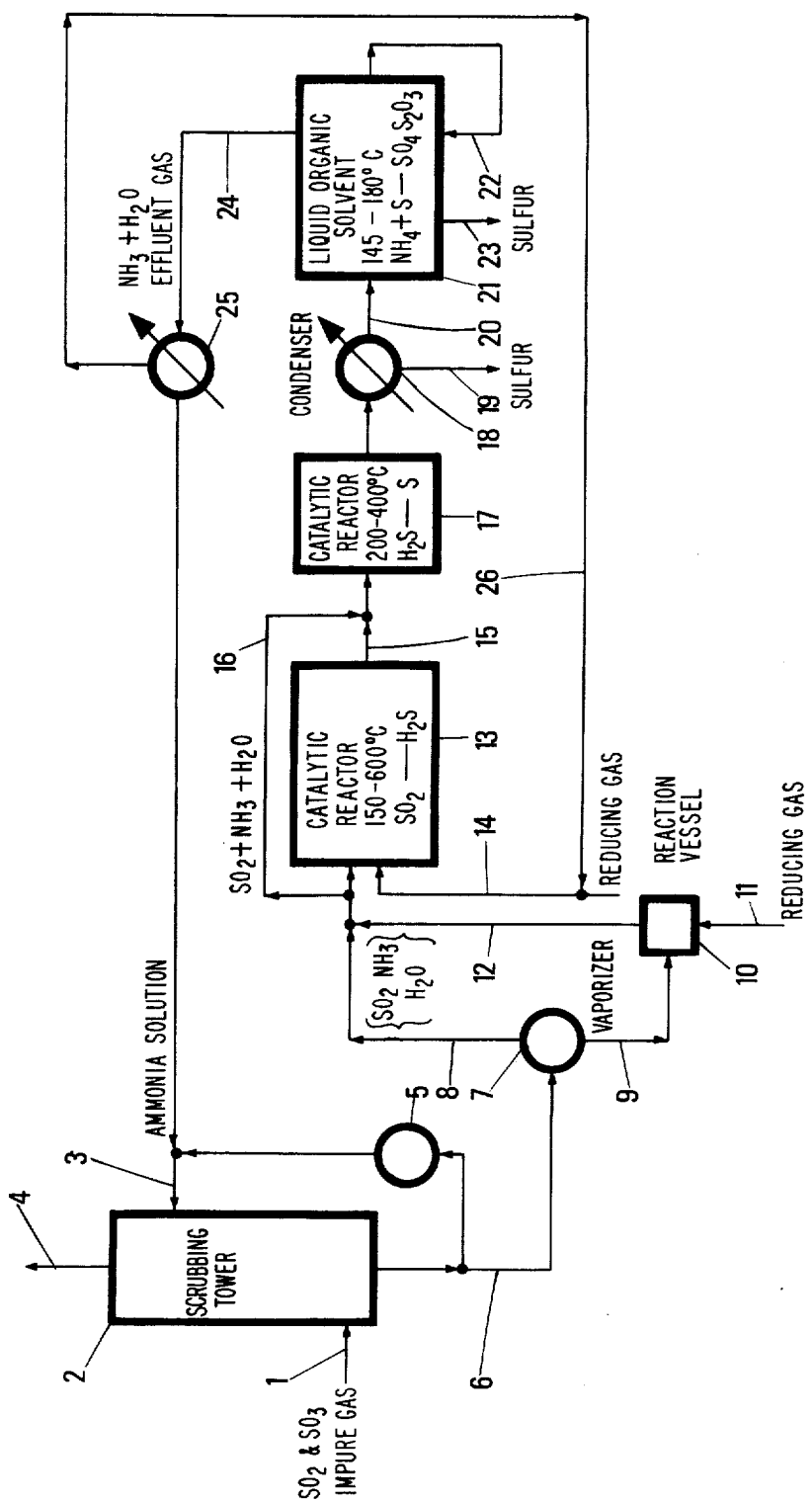

PROCESS FOR REMOVING SULFUR DIOXIDE FROM A GAS AND PRODUCING SULFUR THEREFROM

This application is a continuation-in-part of our co-pending patent application Ser. No. 394,336 filed Sept. 4, 1973 now abandoned.

The invention concerns the removal of sulfur dioxide and optionally sulfur trioxide from gas containing the same together with simultaneous sulfur production.

Stack gas, particularly from power plants fed with fuel-oil or other sulfur-containing materials, or from incinerators burning sulfur compounds, contain $SO_2$ and, in a smaller proportion, $SO_3$ which are both major polluting agents. On the other hand, certain chemical works, for example those producing sulfuric acid, expel $SO_2$-containing gas.

The removal of these compounds by means of ammonia results in a good purification of the gas and produces a solution containing ammonium sulfite and bisulfite, ammonium sulfate and sometimes by-products, for example, ammonium thiosulfates and polythionates.

It has been already proposed to produce sulfur and to recover ammonia from these solutions.

REVIEW OF THE PRIOR ART

French Pat. No. 1.568.748 describes a method according to which ammonium sulfite and bisulfite in aqueous solution are reduced by $H_2S$ to sulfur, in the presence of a solvent. According to another known method, the solution is vaporized at 100–200° C, whereby ammonium sulfite and ammonium hydrogen sulfite are converted to a gaseous mixture containing $SO_2$, $NH_3$ and $H_2O$. $SO_2$ reacts with $H_2S$ to form sulfur, in the presence of a solvent, and $NH_3$ is re-used to prepare the $SO_2$ absorption solution.

Johnstone (U.S. Pat. No. 2,676,090) teaches that ammoniacal liquors are suitable absorbents for sulfur dioxide and sulfur dioxide can be evolved therefrom by heating.

Groenendaal (U.S. Pat. No. 3,764,665) supplies sulfur dioxide to a Claus plant; hydrogen sulfide may be obtained by reducion of a portion of said sulfur dioxide. No ammonia is present in Groenendaal gas.

Benner et al. (U.S. Pat. No. 1,771,481) disclose that ammonia may be present in catalytic amount when reducing sulfur dioxide.

Deschamps et al. (U.S. Pat. No. 3,598,529) disclose a process for reacting $H_2S$ with $SO_2$ in an organic solvent, whereby sulfur is obtained. When treating effluent gas from Claus units, the temperature is about 120° to 140° C.

Renault et al. (U.S. Pat. No. 3,832,454) disclose that $SO_2$ and $H_2S$ may be reacted at 100°–180° C in a solvent to form sulfur and that ammonia may be used as a catalyst. No information is given as to the performance of the process over long periods, except in example 9 where the ammonia content is 0.06 % by volume and the reaction is conducted at 130°C.

SUMMARY OF THE INVENTION

When a Claus plant is fed with a gas containing a high proportion of ammonia, the effluent gas also contains a high proportion of ammonia, for example 5–60 %, usually 12–40 % by volume, together with sulfur vapor and residual $SO_2$ and $H_2S$. If this is cooled to, for example, 150° C for sulfur recovery, there is obtained, instead of liquid sulfur, a hard whitish solid material which cannot be easily discharged from the cooler: it contains a high amount of ammonium salts, mainly ammonium thiosulfate and ammonium sulfate.

If the above effluent gas is fed to a Deschamps et al. unit (U.S. Pat. No. 3,598,59) operated at 120°–140° C, not only is the sulfur fouled with ammonium salts, but the latter also form in large proportion, which results in excessive ammonia loss, fouling and sometimes plugging of the plant.

Further, these ammonium salts appear as extremely fine particles which cannot be filtered easily: they form a pasty material which retains large amounts of organic solvent, and the filtration is slow.

The present process obviates this and provides a process for removing sulfur dioxide from a gas containing the same, wherein said gas is contacted, in a first step (a), with an aqueous ammonia absorbing solution, so as to absorb sulfur dioxide in the form of ammonium sulfites, then, in a second step (b), the solution resulting from (a) is heated, so as to decompose the sulfites to a gas containing sulfur dioxide and ammonia, then, in a third step (c), the gas from step (b) is heated at 150°–600° C with gas capable of reducing $SO_2$ to $H_2S$, in contact with a catalyst for reducing $SO_2$ to $H_2S$, so as to produce a gas essentially containing hydrogen sulfide, sulfur dioxide and ammonia in a molar ratio of $H_2S$ to $SO_2$ of 1.7 – 2.3, and in a fourth step (d), the gas from (c), which has a molar ratio $H_2S/SO_2$ of from 1.7:1 to 2.3:1 is contacted at 200°–400° C with a catalyst for the reaction of $H_2S$ and $SO_2$ to sulfur, and a gas containing free sulfur, ammonia and residual sulfur dioxide and hydrogen sulfide is recovered, and, in a fifth step (e) said gas recovered from step (d) is cooled to 145°–180° C in contact with an organic solvent in the liquid phase, so as to be made free of residual sulfur without substantial formation of ammonium thiosulfate or sulfate, and the resulting ammonia containing effluent gas is used to reconstitute the absorbing solution of (a).

When the gas contains $SO_3$ in addition to $SO_2$, the ammonium sulfite solution also contains ammonium sulfate. An additional step may take place: after vaporization of the major part of the sulfites, the sulfate containing solution is treated with a reducing agent, so as to produce gaseous $SO_2$ and $NH_3$ which may be treated as above.

DETAILED DESCRIPTION

In a first step, a gas containing $SO_2$ and/or $SO_3$ is contacted with an aqueous solution of ammonia or ammonium neutral sulfite, at a temperature usually in the range of from 30° to 80° and preferably from 40° to 60° C, so as to obtain a solution of ammonium sulfites possibly containing ammonium sulfate. The concentration of the absorption solution is not critical; it may vary within a wide range, for example from 0.1 mole per liter up to the saturaion. The resulting solution may be advantageously concentrated by water vaporization at a temperature usually lower than 100° C, by using for example the hot waste gas as a heat source. The absorption solution may, without inconvenience, contain ammonium thiosulfate and ammonium polythionates.

In a second step, the so-obtained solution enriched with ammonium hydrogen sulfite and containing some ammonium neutral sulfite and possibly ammonium sulfate, thiosulfate and/or polythionate, is heated so as to vaporize at least the major portion of the sulfitic components thereof. This vaporization is generally carried out at a temperature above 100° C, preferably from 120° to 160° C. At least 50 % and preferably 80–95 % of the sulfites are removed in the form of a gas containing $SO_2$, $NH_3$ and $H_2O$. The residual liquid effluent contains all the ammonium salts remaining unaffected by said heating. The latter may be converted to $SO_2$ and $NH_3$ by reaction with a reducing agent such as sulfur, ammonium thiosulfate, hydrogen sulfide or carbon monoxide, preferably in at least a stoichiometrical amount. The operation may be carried out, for example, in a molten salt or in liquid sulfur at, for example 150°–440° C. Processes of this type are disclosed, for example, in the U.S. Pat. Nos. 3,810,968 of Renault at al. and 3,833,715 of Deschamps et al. The so-obtained gas, containing $SO_2$, $NH_3$, $H_2O$ and possibly sulfur and $H_2S$ traces, is joined to the gas already produced in said step.

In a third step the resulting gas is heated with a reducing gas, in the presence of a first catalyst, to a temperature of from 150° to 600° C, preferably about 450° C, so as to produce a hydrogen sulfide containing gas.

This step may advantageously be carried out by conducting the reduction of $SO_2$ contained in the supplied gas by means of such an amount of reducing gas that the resulting gas contains both $H_2S$ and $SO_2$, preferably in a proportion of about 2 volumes of $H_2S$ per volume of $SO_2$, i.e. the stoichiometrical amount necessary to produce sulfur, although the desired molar ration $H_2S:SO_2$ may be obtained by adding a calculated amount of untreated gas to the produced gas.

The following are examples of gases which may be usefully employed in this step:natural gas, for example methane or mixtures of methane with light hydrocarbons, synthetic gas, for example carbon monoxide or mixtures of carbon monoxide with hydrogen obtained, for example, by reacting steam with coal or hydrocarbons at high temperature or by pyrolizing hydrocarbons, gas obtained by partial combustion of hydrocarbons, gas resulting from heat treatment of organic compounds, for example methanol, formol, formic acid or oxalic acid.

This step is carried out with supported catalysts consisting of metals or, more often, oxides or sulfides thereof, said metals being selected from the groups VI B and/or VIII of the periodic classification of the elements, preferably Mo, W, Ni, Co and/or Fe. Other metals may be used, for example copper, silver, vanadium, manganese, rhenium and zinc, either alone or associated with the above metals in the form of free metals or metal compounds : for example, vanadium oxides such as $V_2O_3$ or $V_2O_5$, iron, nickel or cobalt sulfides, compositions of metals, for example manganese, chromium and molybdenum or copper and $V_2O_5$. A preferred composition consists of cobalt and molybdenum on alumina. It must be noted that group VI B is designated VI A in the French periodic classification.

The inorganic oxidic carrier preferably used for depositing the catalyst consists, for example, of alumina, magnesia, silica, bauxite, kieselguhr, thoria, zirconia; mixtures of the same may also be used.

Preferred alumina carriers have an area of 2 to 350 $m^2$ per gram and a total pore volume of from 10 to 60 ml per 100 g. The content of metal calculated as oxide, is for example 1–20% b.w. The amount of catalyst used in this step is preferably such that the VVH be in the range of from 100 to 2000, preferably about 500. The "VVh" is the hourly volume of treated gas per unit volume of catalyst. The resulting gas contains $H_2S$, $SO_2$, $NH_3$, $H_2O$, possibly organic sulfur compounds, such as COS or $CS_2$, inert gases such as $CO_2$ or reducing gas when the latter has been used in excess.

This gas is contacted, in a fourth step, with a second catalyst, for example alumina or bauxite, at a temperature of from 200° to 400° C, preferably about 325° C. Any catalyst known as convenient for the reaction of $SO_2$ with $H_2S$ may be used.

In this step, COS and $CS_2$ hydrolyze to $H_2S$ and the $SO_2$ and $H_2S$ acid gases react together to produce sulfur. The gas removed from this catalytic stage contains only a low proportion of acid gases, not more than about 2% by volume, together with sulfur vapor. A partial condensation of said sulfur may be carried out by cooling, for example, to about 200° C.

The fifth step of the process consists in the removal of residual sulfur from the effluent of the fourth step. This sulfur may be recovered by decreasing the temperature down to about 145°–180° C, preferably about 150°–180° C, provided this cooling is carried out in the presence of an organic solvent, for example polyethyleneglycol, so as to avoid contamination of the produced sulfur by ammonium salts, for example ammonium thiosulfates or sulfates. The organic solvents may form the liquid phase at the contact of which residual $H_2S$ and $SO_2$ may react to produce sulfur, as described, for example, in the French Pat. No. 1,592,092 (U.S. Pat. No. 3,598,529), so that at least one of the two acid gases may be completely or nearly completely removed. A two-step technique may also be used comprising a first step of condensing sulfur and a second step of reacting residual $SO_2$ and $H_2S$.

The products of this fifth step are always sulfur, which may be separated, and an effluent gas essentially containing ammonia, water, traces of at least one of the two acid gases, reducing gas whenever the latter has been used in excess, or inert gas, for example $CO_2$. This effluent may be used after sufficient cooling for constituting the absorption solution of the first step. The reducing gas, when present, may be separated from said effluent gas to be used in the third step, if so desired.

The attached drawing is a schematic flowsheet of a comprehensive embodiment of the invention, and while not necessary for proper understanding of the invention, will serve to facilitate same.

Referring to the drawing, the gas to be purified, which contains $SO_2$ and some $SO_3$, is passed from pipe 1 to a washing tower 2 where it meets an ammonia solution supplied from pipe 3. The purified gas is removed through pipe 4. Pipe 3 is used to recirculate the absorption solution through the tower and is provided with a heat exchanger 5. A portion of brine enriched with ammonium hydrogen sulfite is collected in line 6 and passed to a vaporizer 7. The vaporized phase, carrying along about 80% of the sulfites in the form of $SO_2$, $NH_3$ and $H_2O$ is removed through pipe 8. An aqueous liquid effluent containing unconverted ammonium, neutral and acid sulfites, ammonium sulfate and possibly by-products such as ammonium thiosulfate, is removed through line 9. This outflow is supplied to the reaction vessel 10 where it is reacted with a reducing gas supplied from line 11, in a molten salt medium, thus producing vaporized $NH_3$, $SO_2$ and $H_2O$ which are admixed with the vapor supplied from pipe 8 through pipe 12. This vapor is introduced into a reaction vessel 13 containing a catalyst carried on alumina, in which it is heated and contacted with a reducing gas supplied from line 14. The effluent gas of line 15 contains $H_2S$ and $SO_2$ in variable proportions according to the proportion of reducing gas employed; it contains also $NH_3$, $H_2O$ and possibly $CO_2$, sulfur and a reducing gas.

When the $SO_2$ reduction in the reaction vessel 13 has not been carried out with a ratio of the acid gases $H_2S/SO_2$ of about 2, a calculated amount of vapor is supplied to line 15 from lines 8 and 16.

The obtained effluent gas is then supplied to an alumina containing reactor 17. A condenser 18 lowers the temperature; sulfur is recovered therein and removed through line 19. The vapor cooled in unit 18 is supplied from line 20 to a reaction vessel 21 wherein polyethylene glycol of molecular weight 400 is re-circulated through line 22. The formed sulfur flows through line 23 and the effluent gas of line 24 passes through a condenser 25 and meets line 3 as an ammonia containing solution. The reducing gas, when in excess, is conveyed to line 14 through line 26.

EXAMPLE 1

100,000 $Nm^3$ per hour of stack gas containing, by volume:

| $SO_2$ | $SO_3$ | $CO_2$ | $H_2O$ | $N_2$ | $O_2$ |
|---|---|---|---|---|---|
| 2000 ppm | 50 ppm | 12 % | 12 % | 74 % | 2 % | are contacted at 50° C in a 2-stage absorber (n° 2 of the drawing) with an aqueous absorbing solution whose concentrations are 10 N for $NH_4OH$ and 0.15 N for $H_2S$, in the form of ammonia and ammonium thiosulfate.

The so-treated contains only 160 ppm of $SO_2$ and no more $SO_3$.

An ammonium sulfite solution is collected at the bottom of the absorber; its composition in moles per liter is as follows:

| Ammonium sulfites | | Ammonium sulfates | $S_2O_3(NH_4)_2$ |
|---|---|---|---|
| in $SO_2$ | in $NH_3$ | | |
| 7.5 | 10.0 | 0.35 | 0.17 |

This brine is vaporized in unit 7 where about 80% of the sulfites are decomposed to gaseous $SO_2$ and $NH_3$. The liquid outflow containing unconverted sulfites, ammonium sulfate and ammonium thiosulfate is supplied to a reactor 10 containing a bath of molten sodium sulfate maintained at 380° C: the sulfites decompose to $SO_2$, $NH_3$ and $H_2O$ and the ammonium sulfates are reduced by ammonium thiosulfate to $SO_2$, $NH_3$ and $H_2O$; the vapor withdrawn from reactor 10 and consisting of $NH_3$, $SO_2$ and $H_2O$ is mixed with the vapor from unit 7. The vapor supplied to reactor 13 at 450° C has the following % molar composition:

| $SO_2$ | $NH_3$ | $H_2O$ | S |
|---|---|---|---|
| 12 | 16 | 72 | traces |

240 liters per hour of mixture ($H_2$, CO) for each cubic meter of the mixture ($SO_2$, $NH_3$ and $H_2O$) is supplied to reactor 13. Reactor 13 contains 4 $m^3$ of catalyst (3% CoO and 14% $MoO_3$ on alumina). The vapor removed from reactor 13 has the following % molar composition:

| Acid gases ($H_2S/SO_2$ = 2) | $NH_3$ | $CO_2$ | $H_2O$ |
|---|---|---|---|
| 10.1 | 13.7 | 7.1 | 69.1 |

This vapor is contacted with alumina at 325° C; any $H_2S$ formed in reactor 13 reacts with residual $SO_2$ according to the Claus reaction. The effluent gas from reactor 17 contains 2% of acid gases, sulfur, $NH_3$, $CO_2$ and $H_2O$. This gas is cooled to 200° C and contacted in an absorber with polyethylene glycol of molecular weight 400, maintained at 150° C. Condensed sulfur is collected and the vapor removed through line 24 is condensed, so as to form an absorbing solution of composition averaging 10 N for $NH_4OH$ and 0.15 N for $H_2S$.

EXAMPLE 2

Example 1 is repeated with an absorbing solution consisting of an aqueous $NH_3$ solution of 9 moles/liter concentration.

| Ammonium sulfites | | Ammonium sulfates | $H_2O$ |
|---|---|---|---|
| as $SO_2$ | as $NH_3$ | | |
| 7.73 | 9.64 | 0.35 | 38.65 |

This brine is vaporized in vapor 7 where about 80% of the sulfites decompose to gaseous to gaseous $SO_2$ and $NH_3$.

The liquid outflow is supplied to a reactor 10 maintained at 380° C. Liquid sulfur is also supplied in an amount corresponding to 1.5 times the amount theoretically required for reducing for reducing ammonium sulfate to $SO_2$.

The vapor removed from reactor 10 consists of $SO_2$, $NH_3$, $H_2O$ and sulfur; it is admixed with the vapor from vaporizer 7. The vapor supplied to reactor 13 has the following percent molar composition:

| $SO_2$ | $NH_3$ | $H_2O$ | S |
|---|---|---|---|
| 14.2 | 17.7 | 67.95 | 0.15 |

284 liters per hour of a mixture $H_2$/CO for each $m^3$ of mixture $SO_2$, $NH_3$ and $H_2O$ is introduced into the reactor 13. The latter contains 4 $m^3$ of catalyst (3% CoO + 14% $MoO_3$ on alumina). The vapor withdrawn from reactor 13 has the following % molar composition:

| Acid gases ($H_2S$ + $SO_2$) | $NH_3$ | $CO_2$ | $H_2O$ |
|---|---|---|---|
| 11.07 | 13.8 | 11.03 | 64.1 |

This vapor is contacted with alumina at 325° C. Any $H_2S$ formed in reactor 13 reacts with residual $SO_2$ according to the Claus reaction. The effluent gas from reactor 17 contains 2% by volume of acid gases, sulfur, $NH_3$, $CO_2$ and $H_2O$. It is cooled to 200° C, whereby a portion of sulfur condenses and is discharged in the liquid state. The resulting gas, which comprises about 17% by volume of ammonia, about 2% by volume of residual acid gases, sulfur vapor, carbon dioxide and steam, is passed through polyethylene glycol (PEG) maintained at 130° C. Sulfur condenses and settles : 120 kg of sulfur per hour is thus condensed and discharged in the liquid state. Very finely divided salts also form within polyethylene glycol; they comprise mainly ammonium sulfate and ammonium thiosulfate. 420 kg of salts have thus formed in 50 hours. They cannot be easily discharged at the interface between polyethylene glycol and molten sulfur, without substantial loss of solvent, because they consist of very fine particles. They progressively clog the pipes connected to the PEG vessel. They are hardly recoverable by filtration due to low rate of filtration and substantial loss of PEG.

The effluent vapor carries along ammonia : it is cooled for ammonia recovery. The resulting aqueous ammonia solution is recycled to the stack gas absorber. The loss of ammonia, due to the formation of the above ammonium salts, is high.

EXAMPLE 3

Example 2 is repeated, except that PEG is maintained at 140° C. The above disadvantages are also present, although not so important : 250 kg of salts have formed in 50 hours.

EXAMPLE 4

Example 2 is repeated, except that the PEG temperature is 145° C : the amount of ammonium salts formed within 50 hours is 100 kg.

EXAMPLE 5

Example 2 is repeated, except that the PEG temperature is 150° C : ammonium salts form at a rate of 1 kg per hour; they can be discharged by filtration without substantial loss of PEG.

In Examples 3-5, the amount of sulfur condensed within polyethylene glycol and discharged therefrom is 120 kg per hour.

What we claim is:

1. Process for removing sulfur dioxide from a gas containing the same, wherein
   said gas is contacted, in a first step (a), with an aqueous ammonia absorbing solution, so as to absorb sulfur dioxide in the form of ammonium sulfites, then,
   in a second step (b), the solution resulting from (a) is heated, so as to decompose the sulfites to a gas containing sulfur dioxide and ammonia, then, in a third step (c), the gas from step (b) is heated at 150°-600° C with gas capable of reducing $SO_2$ to $H_2S$, in contact with a catalyst for reducing $SO_2$ to $H_2S$ so as to produce a gas essentially containing hydrogen sulfide, sulfur dioxide and ammonia in a molar ratio of $H_2S$ to $SO_2$ of 1.7-2.3, and in a fourth step (d), the gas from (c), which has a molar ratio $H_2S/SO_2$ of from 1.7:1 to 2.3:1 is contacted at 200°-400° C with a catalyst for the reaction of $H_2S$ and $SO_2$ to sulfur, and a gas containing free sulfur, ammonia and residual sulfur dioxide and hydrogen sulfide is recovered, and, in a fifth step (e), said gas recovered from step (d) is cooled to about 150° C in contact with an organic solvent in the liquid phase, so as to be made free of residual sulfur without substantial formation of ammonium thiosulfate or sulfate, and the resulting ammonia containing effluent gas is used to reconstitute the absorbing solution of (a).

2. A process according to claim 1, wherein the free sulfur containing gas supplied to step (e) has an ammonia content of 5-60% by volume.

3. A process according to claim 1, wherein the free sulfur containing gas supplied to step (e) has an ammonia content of 12-40% by volume.

4. A process according to claim 1, wherein the gas capable of reducing $SO_2$ to $H_2S$ comprises a mixture of carbon monoxide and hydrogen.

5. A process according to claim 1, wherein said free sulfur containing gas is at a temperature not less than about 200° C prior to being contacted with said organic solvent.

6. A process according to claim 1, wherein the sulfur dioxide containing gas also contains $SO_3$, whereby ammonium sulfates are produced in step (a) in addition to ammonium sulfites, and, after decomposition of the sulfites in step (b), the remainder of the solution, which contains ammonium sulfates, is treated with a reducing agent, so as to convert said ammonium sulfates to $SO_2$ and $NH_3$ which are subsequently subjected to the third step of the process.

7. A process according to claim 6, wherein the treatment of the ammonium sulfates with a reducing agent is carried out in a bath of molten sodium sulfate.

8. A process according to claim 1, wherein the catalyst of the third step comprises at least one metal or oxide or sulfide thereof, said metal being selected from the metals of groups VI B and VIII of the periodic classification of the elements.

9. A process according to claim 1, wherein the catalyst of the third step is a mixture of cobalt and molybdenum oxides on alumina.

10. A process according to claim 1, wherein the catalyst of the third step comprises at least one metal or oxide or sulfide thereof, the metal being copper, silver, vanadium, manganese, rhenium or zinc.

11. A process according to claim 1, wherein the temperature of the third step is about 450° C.

12. A process according to claim 1, wherein the catalyst of the fourth step is alumina or bauxite.

13. A process according to claim 1, wherein the organic solvent of the fifth step is polyethylene glycol.

14. A process according to claim 1, wherein the gas capable of reducing $SO_2$ to $H_2S$ is a gas comprising either methane or a mixture of carbon monoxide and hydrogen.

15. A process according to claim 1, wherein the gas capable of reducing $SO_2$ to $H_2S$ comprises methane.

* * * * *